Figure 1:
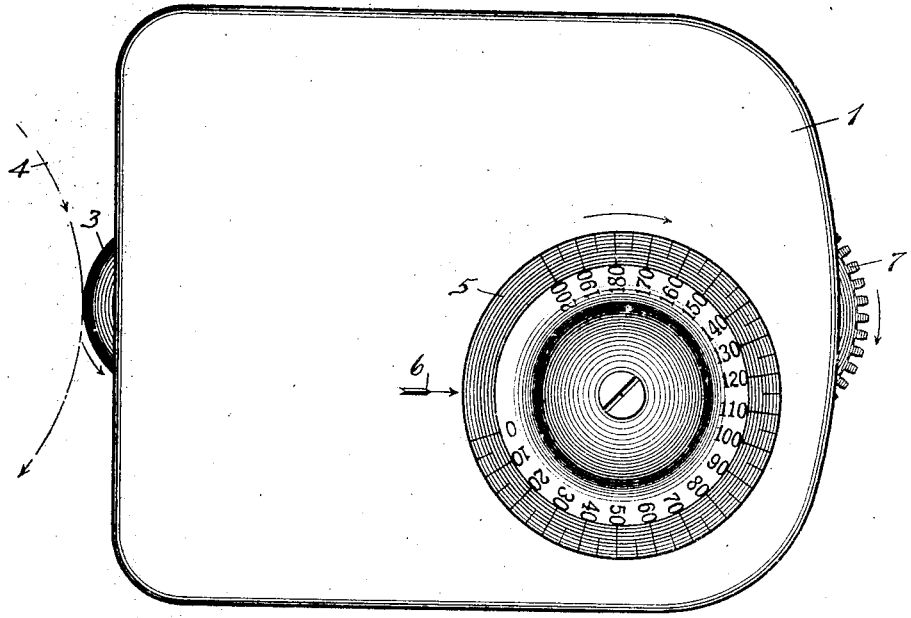

No. 839,916.

PATENTED JAN. 1, 1907.

F. M. CARROLL.
TACHOMETER.
APPLICATION FILED DEC. 6, 1905.

4 SHEETS—SHEET 1.

Witnesses
G. V. Rasmussen
H. A. Allyn

Inventor
FRED M. CARROLL
By his Attorneys

No. 839,916. PATENTED JAN. 1, 1907.
F. M. CARROLL.
TACHOMETER.
APPLICATION FILED DEC. 6, 1905.

4 SHEETS—SHEET 2.

Witnesses
G. V. Rasmussen

Inventor
FRED M. CARROLL
By his Attorneys

No. 839,916. PATENTED JAN. 1, 1907.
F. M. CARROLL.
TACHOMETER.
APPLICATION FILED DEC. 6, 1905.

4 SHEETS—SHEET 3.

Witnesses
Inventor
FRED M. CARROLL
By his Attorneys

No. 839,916. PATENTED JAN. 1, 1907.
F. M. CARROLL.
TACHOMETER.
APPLICATION FILED DEC. 6, 1905.

4 SHEETS—SHEET 4.

Witnesses

Inventor
Fred M. Carroll
By his Attorneys

UNITED STATES PATENT OFFICE.

FRED M. CARROLL, OF NEW HAVEN, CONNECTICUT.

TACHOMETER.

No. 839,916.  Specification of Letters Patent.  Patented Jan. 1, 1907.

Application filed December 6, 1905. Serial No. 290,617.

*To all whom it may concern:*

Be it known that I, FRED M. CARROLL, a citizen of the United States, residing at New Haven, county of New Haven, Connecticut, have invented certain new and useful Improvements in Tachometers, of which the following is a full, clear, and exact description.

My invention relates to tachometers, and particularly an instrument adapted for ascertaining the surface speed in machine-tool work.

The object of the invention is to provide an instrument which may be readily applied to a relatively moving object to determine its linear speed in feet per minute without the necessity of employing a stop-watch or other device of similar character. As devices of this character are sometimes required to be used in places in which accuracy of application is impossible and sometimes in places where a reading could not be possibly taken, I have sought to construct the instrument so that the speed is indicated irrespective of the time of application and so that a short time is allowed after the instrument is applied to the moving object before the indication is begun, thus allowing sufficient time in which a good contact with the moving object may be obtained.

The accompanying three sheets of drawings illustrate the principles of the invention. Briefly, it comprises a casing containing the operating parts of the mechanism. A dial on the outside of the casing is graduated to indicate a speed in feet per minute. A contact-roller protruding from the case is adapted to be rotated by the moving object whose speed is to be determined. A train of gears connects the contact-roller with the dial. Several revolutions of the contact-wheel are permitted before the dial is brought to zero position. Simultaneously with the beginning of indication a timing device is released which operates for a definite period of, say, one second. At the end of the movement of the timing device the dial is disconnected from the driving-train and remains stationary, no matter how long the contact-roller continues to rotate. The instrument may then be taken to any convenient place and a reading taken. The graduation of the dial of course could be in any units desired. It is obvious that the instrument might be adapted to indicate revolutions per minute by constructing the contact-roller so as to rotate in proportion to angular speed and graduating the dial accordingly. When the reading is taken, the dial and timing device may be reset by the digital operation of a wheel a portion of which protrudes from the case.

Figure 2:
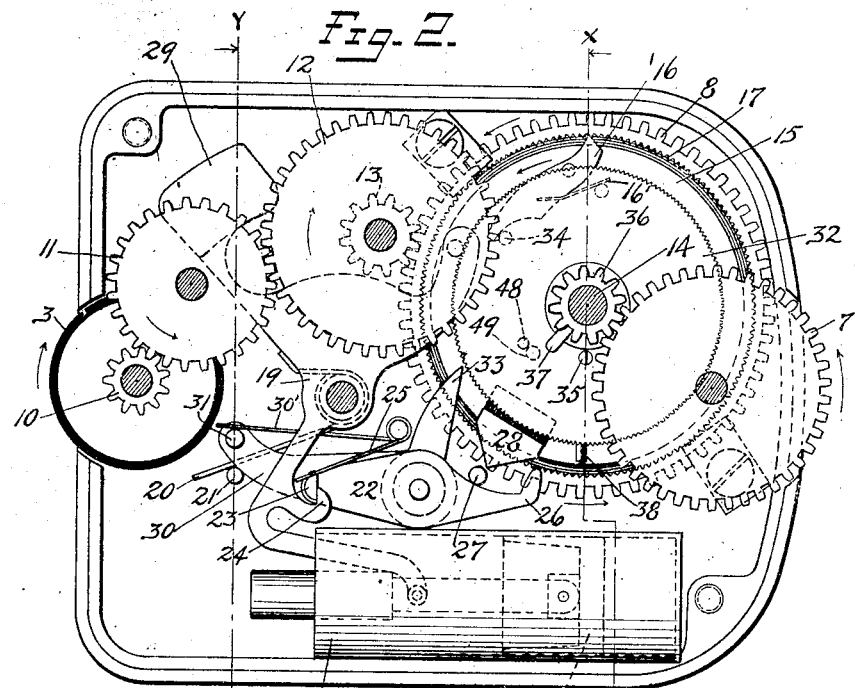
Figure 3:
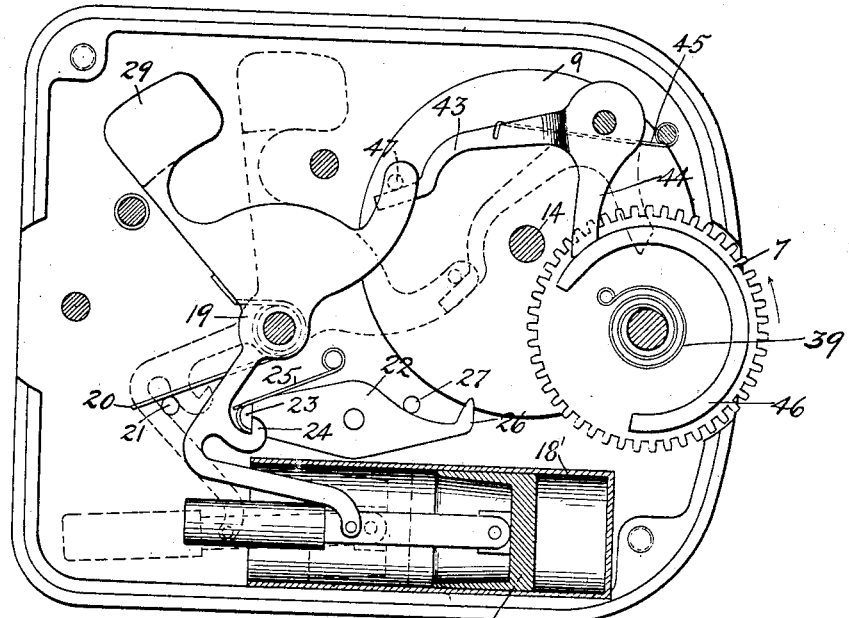
Figure 4:
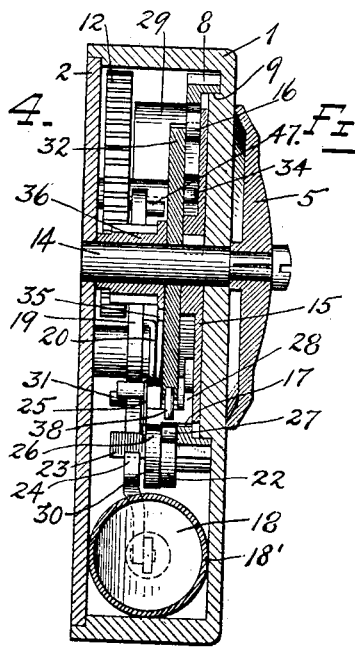
Figure 5:
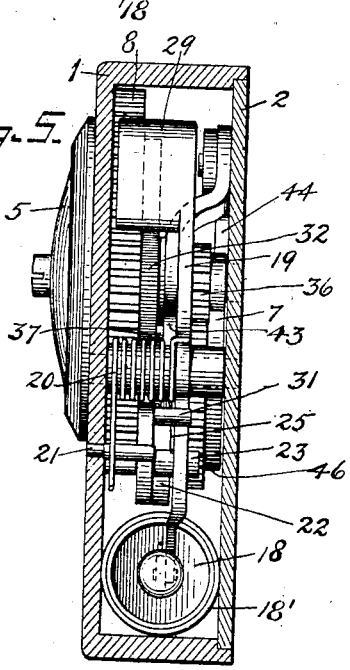
Figure 6:
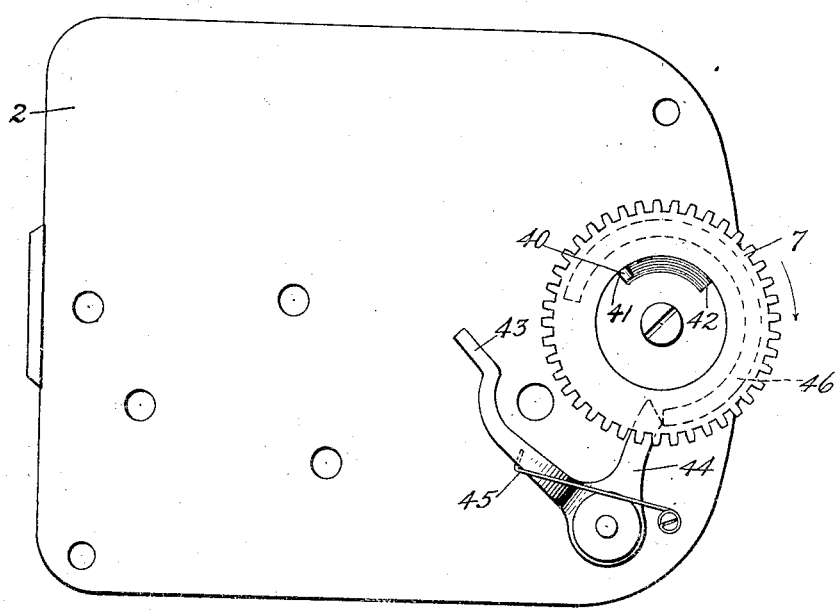
Figures 7, 8, 9:
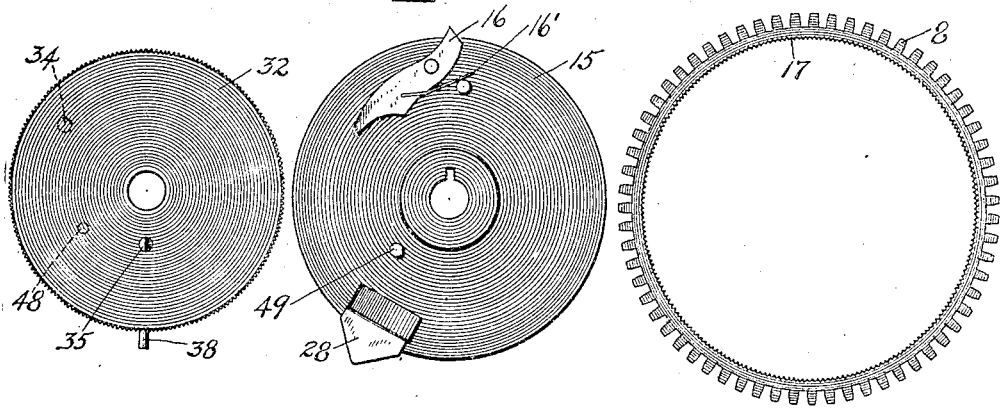
Figure 10:
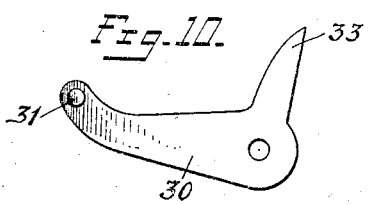
Figure 11:
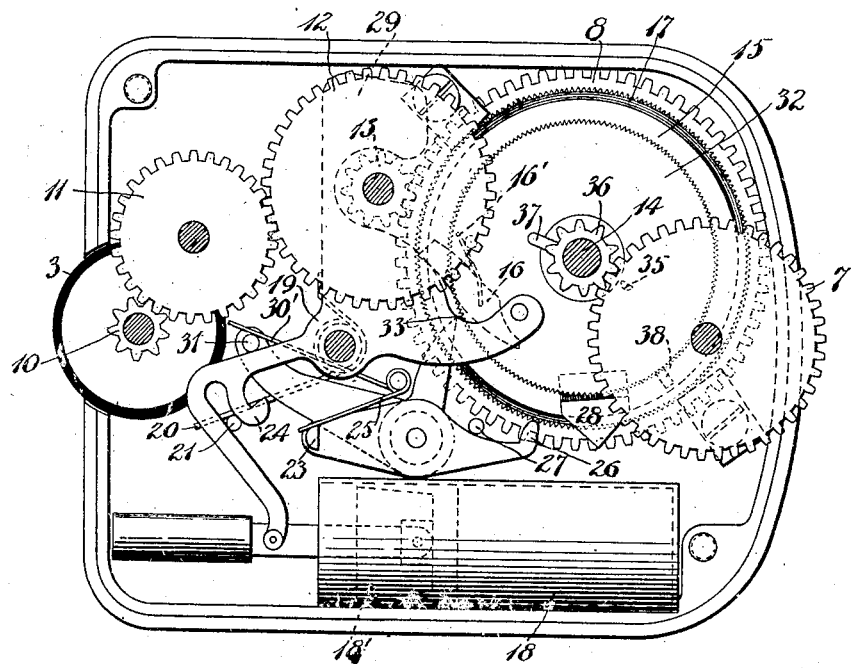

Figure 1 is a view of the instrument, showing the contact-roller, indicating-dial, and resetting-wheel. Fig. 2 is a view of the interior of the mechanism, taken from the opposite side of the view in Fig. 1 and showing the train of gears connecting the contact-roller with the shaft of the indicating-dial, the timing mechanism, and the connections for resetting the dial. Fig. 3 is a view similar to Fig. 2, but with certain parts omitted and showing in place thereof the connections for resetting the timing device. Fig. 4 is a sectional view of the mechanism, taken on the plane of the line X X looking in the direction of the arrows in Fig. 2. Fig. 5 is a section on the plane of the line Y Y, Fig. 2, looking in the direction of the arrows. Fig. 6 is a view of the back plate, with its attached parts, of the resetting mechanism. Fig. 7 shows an annular member of the driving-train. Fig. 8 shows a plate with a pawl for connecting the annulus to the dial-shaft and a cam for starting the timing mechanism. Fig. 9 shows a ratchet-plate with projections for disconnecting the annulus from the pawl and cam-plate and also projections for coöperating with the pawl-plate for resetting. Fig. 10 shows a dog for stopping the releasing and resetting mechanism. Fig. 11 is a view similar to Fig. 2, showing the parts in the position after a predetermined time.

1 indicates the main body of the case, having flanges constituting the sides.

2 is the back plate.

3 is a roller adapted to contact with the member 4, whose surface speed it is desired to ascertain.

5 is the indicating-dial graduated in feet per minute, so that the speed of the work may be read directly. This is of great advantage in machine-shops where it is important that all the work, such as lathe-work, be performed at the highest possible speed that the tool will stand.

6 is the arrow from which point readings on the dial are to be taken. 7 is the resetting-wheel. All the arrows on rotating parts indicate the directions in which the parts are normally operated. The arrows on the resetting-wheel indicate the direction in which it is rotated to reset the dial, while the arrows on the dial and other parts indicate the directions in which they rotate for indicating purposes.

*Indicating mechanism.*—8 is an annular member rotatably mounted on the hub 9 of the case 1. (See Figs. 3 and 4.) This is driven from the contact-roller 3 by a train of gears 10 11 12 13. 14 is the shaft to which the dial is attached. 15 is a plate also mounted so as to rotate with the shaft 14. 16 is a pawl pivotally carried by the plate 15 and normally held in engagement with the ratchet-teeth 17 on the interior of the annulus by the spring 16'. The rotation of the contact-roller 3 thus causes rotation of the dial so long as the pawl 16 engages the ratchet 17.

*Timing mechanism.*—18 is a piston suitably mounted in a cylinder 18' carried in the casing. 19 is a pivotally-mounted frame connected to the piston-rod. 20 is a spring which presses against the stationary stop 21 and against the frame 19, so as to tend to rotate the frame clockwise as viewed in Fig. 2. 22 is a pivotally-mounted dog having projection 23 normally engaging the hook 24 of the frame 19. This dog is normally under pressure of the spring 25, so that the opposite end 26 engages the stop 27. 28 is a cam projection carried by the plate 15, which has a beveled end adapted to engage the end 26 of the dog 22 when the plate 15 has rotated sufficiently to bring the dial with its zero opposite the arrow 6. This tilts the dog 22, lifts the projection 23, and releases the frame 19. The spring 20 then rotates the frame on its axis and pulls the piston 18 over to the left. 29 an enlarged portion of the frame 19 constituting a counterbalance, so that in conjunction with the weight and co-location of the other parts of the frame and the piston the time of movement of the piston is not affected by any particular angular position in which the parts may be applied. 30 is a second pivoted dog pressed against the stop 21 by spring 30' and carrying the projection 31, against which the frame 19 strikes as it moves to the left. The ratchet-plate 32, rotatably mounted on the dial-shaft, is adapted to be engaged by the point 33 of the dog 30 when the frame 19 strikes against the stop 31 and tilts it on its pivot. The projection 34 at the back of the ratchet 32 thus is brought to a stop at the end of the movement of the timing device, and the continued rotation of the plate 15 brings the incline of the tail of the dog 16 outside the projection 34, so that the dog is cast off from the ratchet 17 and the contact-roller and train may continue its movement without affecting the dial indication.

*Resetting the dial.*—35 is a projection carried by the top of the ratchet-wheel 32. 36 is a pinion loosely mounted on the dial-shaft 14, carrying the projection 37. The parts are shown in Fig. 2 in the position which they would occupy just after the contact-roller 3 has begun to rotate. The rotation of the plate 15 from the annulus by means of the engagement of the pawl 16 also rotates the ratchet 32, because of the yielding engagement of the tail of the pawl against the projection 34. The rotation carries the projection 35 around in the direction of the arrow. When the timing device is operated and the reading of the dial taken, the rotation of the wheel 7 in the direction of its arrow rotates the pinion 36 until the projection 37 strikes the projection 35 and carries the ratchet 32 around in a clockwise direction. At this time the pawl 16 is disengaged from the ratchet-teeth 17. The projection 38 from the ratchet 32 strikes against the projection 28, carried by the plate 15, so that in the resetting the ratchet and plate rotate together until the projection 28 strikes against the point 33 of the dog 30 and stops the plate, together with the dial-shaft to which it is attached. 39 is a spring which tends to return the wheel 7 to its normal position with its projection 40 engaging the shoulder 41. The shoulder 42 provides an abutment for the stop when the wheel is being rotated to reset the mechanism.

*Resetting the timing device.*—43 and 44 are two arms of a lever normally in the position shown dotted in Fig. 3 by means of a spring 45. 46 is a cam carried by the wheel 7, adapted to engage the arm 44 of the lever. 47 is a projection from the frame 19, adapted when in the dotted position shown in Fig. 3 to be engaged by the arm 43 of the lever. Rotation of the wheel 7 in the direction of the arrow will bring the frame 19 over from its dotted position to its full-line position in Fig. 3, thus returning the timing-piston to its original position. At the same time the projection 28 from the plate 15 strikes the arm 26 of the dog 22 and passes to the left. The projection 23 snaps over the hook of the frame 19 and holds the timing mechanism in its original position ready for a new reading. When the resetting-wheel 7 is released, the spring 39 returns it to its position, as shown in Figs. 2 and 6. When pressure is released from the projection 35 and ratchet-plate 32, the back pressure of the pawl 16 is exerted against the projection 34 to rotate the plate 32 anticlockwise. This rotation is stopped by the projection 48 on the plate 32 striking against the projection 49 on the plate 15. At this moment the pawl 16 is in engagement with the ratchet-teeth 17, and the resistance is sufficient to overcome the momentum caused by the pawl-spring.

What I claim is—

1. In a mechanism for determining velocity, a wheel adapted to be driven, a dial, a driving connection from said driven wheel to said dial, timing mechanism, means for setting the timing mechanism into operation a short interval after the dial begins to move, and means for disconnecting the dial from the driving mechanism after a definite period of time.

2. In a mechanism for determining velocity, a wheel adapted to be driven, a dial, a driving connection from said driven wheel to said dial, timing mechanism, means for setting the timing mechanism into operation a short interval after the dial begins to move, means for disconnecting the dial from the driving mechanism after a definite period of time, and means for resetting the dial and timing mechanism.

3. In a mechanism for determining velocity, a driving-train, a dial, means of connection between said train and dial, timing mechanism, a dog for locking said timing mechanism, and means for engaging said dog for releasing said dogging mechanism when the zero-point of the dial is opposite the base-point for readings.

4. In a mechanism for determining velocity, a dial, means for rotating said dial, a timing-piston, a balanced frame connected to said piston, means moving with the dial for releasing said piston, and means controlled by said frame for stopping said dial.

5. In an instrument for determining velocity, a driving-train including an annular member having ratchet-teeth on the interior, a dial, a plate rotatable with said dial, a pawl carried by said plate and engaging said ratchet, and means for automatically disengaging said pawl.

6. In an instrument for determining velocity, a driving-train, a pawl, timing mechanism, a plate movable with said pawl, and means carried by said plate for releasing said timing mechanism.

7. In an instrument for determining velocity, a driving-train, a pawl, means of connection between said dial and train, timing mechanism, a ratchet mounted concentrically with said pawl but having limited rotative movement relative thereto, and a dog controlled by said timing mechanism for engaging said ratchet.

8. In a mechanism for determining velocity, a dial, a driving-train, timing mechanism including a frame, a locking-dog engaging said frame, means for releasing said dog, and a second dog adapted to be operated by said train for stopping said dial.

9. In an instrument for determining velocity, timing mechanism including a pivoted spring-pressed frame and means for resetting said frame including a wheel, a projection carried thereby and a lever engaged by said projection and adapted to engage said frame 10. In an instrument for determining velocity, timing mechanism including a pivoted spring-pressed frame and means for resetting said frame including a wheel, a projection carried thereby, a lever engaged by said projection and adapted to engage said frame, and means for limiting the rotation of said wheel.

11. In an instrument for determining velocity, a dial, a driving-train including an annular member, a plate movable with said dial, means for connecting said plate to said annular member, a ratchet, said annular member, plate and ratchet being mounted concentric with said dial, and stops carried by said plate and ratchet adapted to coöperate with each other for limiting relative movements.

12. In an instrument for determining velocity, a dial, a driving-train, means for connecting said train to said dial, a pinion mounted concentric with said dial, a wheel resettingly engaging said pinion, and means controlled by said pinion for resetting the dial.

13. In an instrument for determining velocity, a driving-train including an annular member, a plate, a spring-pressed pawl carried by said plate, a ratchet-wheel projection carried thereby adapted to engage said pawl, and means for automatically stopping said ratchet-wheel.

14. In an instrument for determining velocity, a driving-train, timing mechanism, and means for automatically releasing the timing mechanism upon the operation of the train.

FRED M. CARROLL.

Witnesses:
 ARTHUR J. RALPH,
 JAMES T. BAIRD.